(12) United States Patent
Wang et al.

(10) Patent No.: US 12,304,588 B2
(45) Date of Patent: May 20, 2025

(54) FOLDING DEVICE AND SCOOTER (71) Applicant: NINEBOT (CHANGZHOU) TECH CO., LTD., Changzhou (CN)

(72) Inventors: Can Wang, Changzhou (CN); Huocheng Wei, Changzhou (CN)

(73) Assignee: NINEBOT (CHANGZHOU) TECH CO., LTD., Changzhou (CN)

( * ) Notice: Subject to any disclaimer, the term of this patent is extended or adjusted under 35 U.S.C. 154(b) by 639 days.

(21) Appl. No.: 17/584,504

(22) Filed: Jan. 26, 2022

(65) Prior Publication Data

US 2022/0234673 A1  Jul. 28, 2022

(30) Foreign Application Priority Data

Jan. 27, 2021 (CN) .......................... 202110112212.9
Jan. 27, 2021 (CN) .......................... 202120234173.5

(51) Int. Cl.
 B62K 15/00 (2006.01)
 B62K 3/00 (2006.01)
(52) U.S. Cl.
 CPC ............ B62K 15/006 (2013.01); B62K 3/002 (2013.01)
(58) Field of Classification Search
 CPC .......... B62K 15/006; B62K 3/002; F16B 2/02
 USPC ....................................................... 280/278
 See application file for complete search history.

(56) References Cited

U.S. PATENT DOCUMENTS

| 5,906,452 A | 5/1999 | Lee |
| 6,196,566 B1 * | 3/2001 | Zhang ................. B62K 15/008 |
| | | 280/278 |
| 6,378,880 B1 * | 4/2002 | Lin ....................... B62K 15/006 |
| | | 280/87.05 |
| 9,371,108 B2 | 6/2016 | Bettin |
| 2003/0070504 A1 * | 4/2003 | Tsai ......................... G05G 1/04 |
| | | 74/520 |

(Continued)

FOREIGN PATENT DOCUMENTS

| CN | 101519096 A | 9/2009 |
| CN | 102530159 A | 7/2012 |

(Continued)

OTHER PUBLICATIONS

Lu et al., Locking Device for Seat Tube of Electric Folding Scooter, Oct. 15, 2015, WO 2015/154394 A1, Machine Translation of Description (Year: 2015).*

(Continued)

*Primary Examiner* — Jacob D Knutson
*Assistant Examiner* — Morgan Rappe
(74) *Attorney, Agent, or Firm* — FROST BROWN TODD LLP (57) ABSTRACT

The present disclosure discloses a folding device and a scooter having the folding device. The folding device includes: a first folding seat and a second folding seat arranged opposite to each other and rotatably coupled to each other, the first folding seat being located above the second folding seat; a first locking assembly rotatably coupled to the second folding seat, the first locking assembly being rotatable between a first position and a second position; a second locking assembly configured to clamp or release the first folding seat and the first locking assembly; and a reset member coupled to at least one of the first locking assembly and the second locking assembly.

18 Claims, 6 Drawing Sheets

(56) References Cited

U.S. PATENT DOCUMENTS

| | | | | |
|---|---|---|---|---|
| 2009/0020350 A1* | 1/2009 | Wu | ............ | B62K 15/008 |
| | | | | 180/208 |
| 2010/0135715 A1 | 6/2010 | Huang | | |
| 2018/0001954 A1* | 1/2018 | Uimonen | ............ | B62K 15/006 |

FOREIGN PATENT DOCUMENTS

| | | | | |
|---|---|---|---|---|
| CN | 203753327 U | * | 8/2014 | ............ B62K 15/00 |
| CN | 203766993 | | 8/2014 | |
| CN | 205769883 U | | 12/2016 | |
| CN | 106364614 A | | 2/2017 | |
| CN | 108167289 A | | 6/2018 | |
| CN | 111874148 A | | 11/2020 | |
| CN | 215155325 U | | 12/2021 | |
| EP | 2471701 A1 | * | 7/2012 | ........... B62K 15/006 |
| KR | 2017-0141372 A | | 12/2017 | |
| WO | WO-2015154394 A1 | * | 10/2015 | ............ B62K 15/00 |

OTHER PUBLICATIONS

Extended European Search Report dated Jun. 23, 2022 for Application No. 22152033.1, 10 pages.
Chinese Office Action dated Dec. 8, 2024 for Application No. 202110112212.9, 17 pages.
Chinese Notice of Allowance dated Feb. 20, 2025 for Application No. 202110112212.9, 5 pages.

\* cited by examiner

FOLDING DEVICE AND SCOOTER

CROSS-REFERENCE TO RELATED APPLICATIONS

This application is based on and claims priority to Chinese Application Nos. 202110112212.9 and 202120234173.5, both filed on Jan. 27, 2021, the entire contents of which are incorporated herein by reference for all purposes.

FIELD

The present disclosure relates to the field of transportation tools, and more particularly to a folding device and a scooter with the folding device.

BACKGROUND

Scooters are easy to store and carry due to their reduced overall volume by folding vertical tubes.

In the related art, a vertical tube of a scooter is folded and locked by a four-link mechanism, a lock nut or a hook. However, the safety of folding and locking the vertical tube with the above structure is poor, which is easy to loosen due to vibration during riding. Hence, a locking mechanism of the vertical tube will fail and the vertical tube will suddenly fold during riding, causing poor safety of the scooter.

SUMMARY

A folding device according to embodiments of the present disclosure includes: a first folding seat and a second folding seat arranged opposite to each other and rotatably coupled to each other, the first folding seat being located above the second folding seat; a first locking assembly rotatably coupled to the second folding seat, the first locking assembly being rotatable between a first position where the first locking assembly presses the first folding seat against the second folding seat and a second position where the first locking assembly releases the first folding seat; a second locking assembly coupled to at least one of the first folding seat and the first locking assembly to clamp or release the first folding seat and the first locking assembly; a reset member coupled to at least one of the first locking assembly and the second locking assembly, and configured to perform at least one of resetting the first locking assembly after the first locking assembly is rotated from the first position to the second position, and resetting the second locking assembly after the second locking assembly releases the first folding seat and the first locking assembly.

A scooter according to another aspect of the present disclosure includes: a folding device including: a first folding seat and a second folding seat arranged opposite to each other and rotatably coupled to each other, the first folding seat being located above the second folding seat; a first locking assembly rotatably coupled to the second folding seat, the first locking assembly being rotatable between a first position where the first locking assembly presses the first folding seat against the second folding seat and a second position where the first locking assembly releases the first folding seat; a second locking assembly coupled to at least one of the first folding seat and the first locking assembly to clamp or release the first folding seat and the first locking assembly; a reset member coupled to at least one of the first locking assembly and the second locking assembly, and configured to perform at least one of resetting the first locking assembly after the first locking assembly is rotated from the first position to the second position and resetting the second locking assembly after the second locking assembly releases the first folding seat and the first locking assembly; a vertical tube coupled to an end of the first folding seat away from the second folding seat; and a front stem and fork coupled to an end of the second folding seat away from the first folding seat.

DETAILED DESCRIPTION

Embodiments of the present disclosure are described in detail below, and examples of the embodiments are illustrated with reference to the accompanying drawings. The embodiments described below with reference to the accompanying drawings are merely exemplary and intended to explain the present disclosure, and shall not be construed as limitation on the present disclosure.

Figure 1:
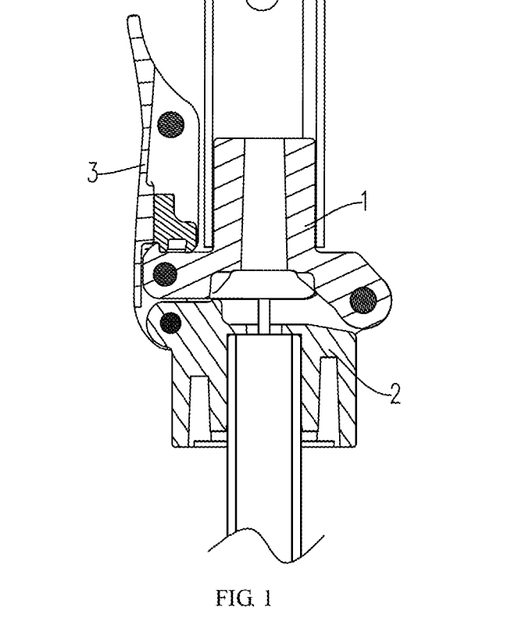
FIG. 1 is a schematic view of a folding device according to an embodiment of the present disclosure.
Figure 2:
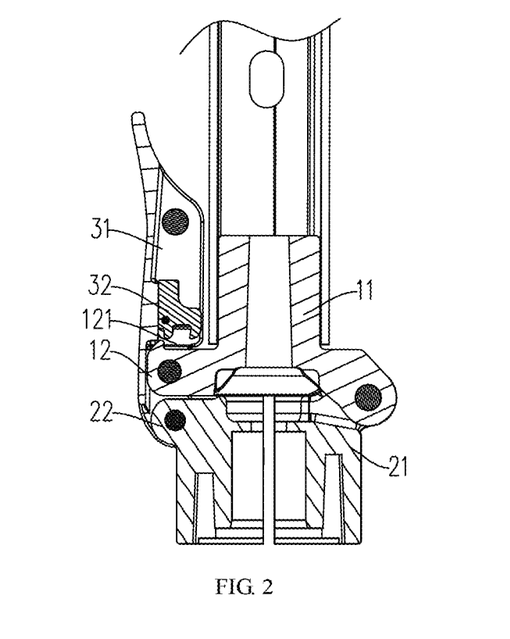
FIG. 2 is a schematic view of a linkage assembly of a folding device according to an embodiment of the present disclosure.
Figure 3:
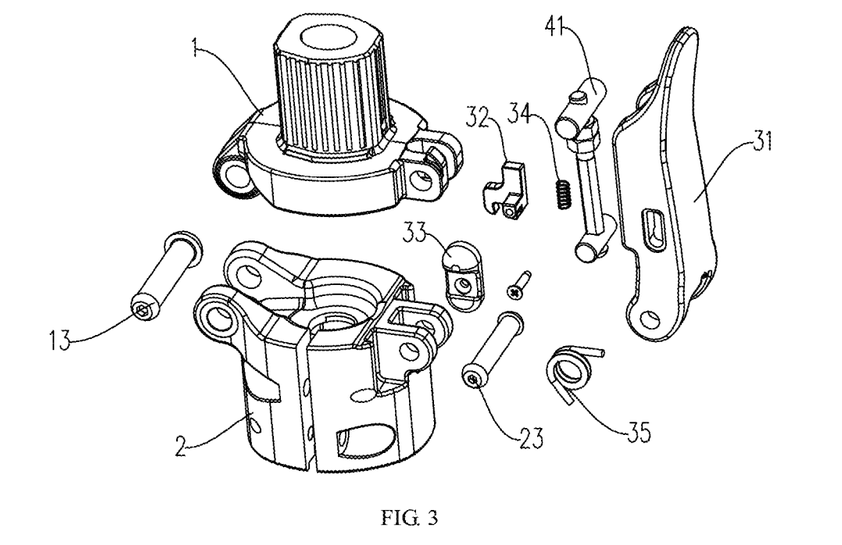
FIG. 3 is an exploded view of a folding device according to an embodiment of the present disclosure.

As illustrated in FIGS. 1-3, a folding device according to embodiments of the present disclosure includes a first folding seat 1, a second folding seat 2, a first locking assembly 3, a second locking assembly 4, and a reset member. The first folding seat 1 and the second folding seat 2 are arranged opposite to each other, the first folding seat 1 is located above the second folding seat 2, and a lower end face of the first folding seat 1 is opposite to an upper end face of the second folding seat 2. The first folding seat 1 is rotatably coupled to the second folding seat 2.

The first locking assembly 3 is rotatably coupled to the second folding seat 2, and the first locking assembly 3 is rotatable between a first position and a second position. In the first position, the first locking assembly 3 presses the first folding seat 1 against the second folding seat 2, such that the first folding seat 1 and the second folding seat 2 cannot rotate relative to each other. In the second position, the first locking assembly 3 releases the first folding seat 1 such that the first folding seat 1 can rotate relative to the second folding seat 2.

The second locking assembly 4 is coupled to at least one of the first folding seat 1 and the first locking assembly 3 to tightly clamp or release the first folding seat 1 and the first locking assembly 3. When the second locking assembly 4 tightly clamps the first folding seat 1 and the first locking assembly 3, the first folding seat 1 and the second folding seat 2 cannot rotate relative to each other.

The reset member is coupled to at least one of the first locking assembly 3 and the second locking assembly 4. The reset member is configured to reset the first locking assembly 3 after the first locking assembly 3 is rotated from the first position to the second position, and/or reset the second locking assembly 4 after the second locking assembly 4 releases the first folding seat 1 and the first locking assembly 3. It may be understood that the reset member can drive the first locking assembly 3 and/or the second locking assembly 4 to reset, so as to achieve automatic locking of the folding device.

For the folding device according to the embodiments of the present disclosure, through a two-stage locking arrangement of the first locking assembly 3 and the second locking assembly 4, the locking stability of the folding device can be improved, preventing locking failure caused by false touch or mechanical vibration, and effectively enhancing the reliability and safety of the folding device. In addition, the automatic locking of the folding device can be achieved by the reset member, improving user experience.

As illustrated in FIG. 1, in some embodiments, the first folding seat 1 includes a first body 11 and a first protrusion 12, and the first protrusion 12 protrudes outwards from a periphery of the first body 11. Similarly, the second folding seat 2 includes a second body 21 and a second protrusion 22, and the second protrusion 22 protrudes outwards from a periphery of the second body 21. The first protrusion 12 is arranged opposite to the second protrusion 22, and a first groove 121 is formed in a side of the first protrusion 12 away from the second protrusion 22.

Furthermore, the first locking assembly 3 is rotatably coupled to the second protrusion 22. In the first position, at least a part of the first locking assembly 3 is clamped in the first groove 121 such that the first locking assembly 3 presses the first folding seat 1 against the second folding seat 2 by the first protrusion 12. In the second position, at least the part of the first locking assembly 3 is away from the first groove 121, such that the first locking assembly 3 releases the first folding seat 1.

As illustrated in FIG. 2, specifically, the first locking assembly 3 includes an unlocking wrench 31 and a locking block 32. The unlocking wrench is rotatably coupled to the second protrusion 22, and the unlocking wrench 31 has a cavity. The locking block 32 is fitted in the cavity of the unlocking wrench 31, and the locking block 32 is movable along a length direction of the unlocking wrench 31 relative to the unlocking wrench 31, such that an outer end of the locking block 32 is clamped in the first groove 121 in the first position and is away from the first groove 121 before the unlocking wrench 31 moves from the first position to the second position. It should be noted that the outer end of the locking block 32 refers to an end of the locking block 32 close to the first protrusion 12.

Figure 4:
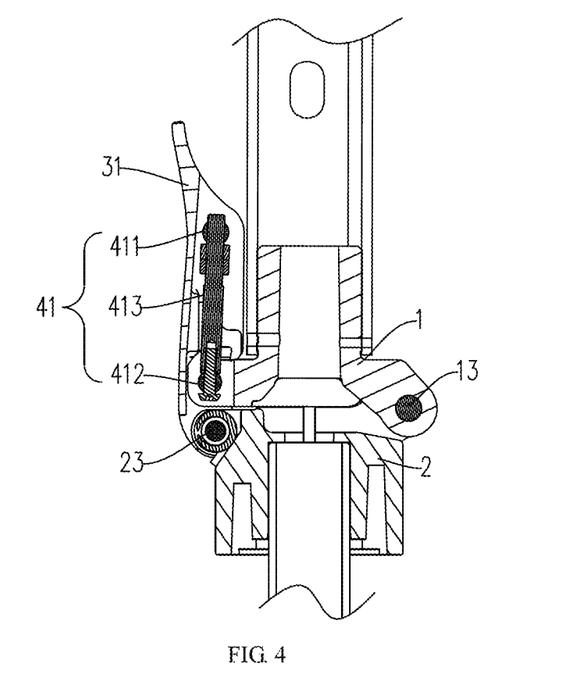
FIG. 4 is a schematic view illustrating that a locking block of a folding device is separated from a first groove according to an embodiment of the present disclosure.

As illustrated in FIG. 4, the locking block 32 is movable along the length direction of the unlocking wrench 31. When the unlocking wrench 31 is in the first position, the locking block 32 may be clamped in the first groove 121 or may be away from the first groove 121. When the outer end of the locking block 32 is clamped in the first groove 121, the unlocking wrench 31 cannot move from the first position to the second position, that is, the unlocking wrench 31 is locked in the first position, and the unlocking wretch cannot move from the first position to the second position until the locking block 32 gets away from the first groove 121. Thus, the locking block 32 serves as a safety lock to lock the unlocking wrench 31, such that the first locking assembly 3 is locked in the first position, which can effectively prevent any unlocking failure caused by false touch.

Figure 5:
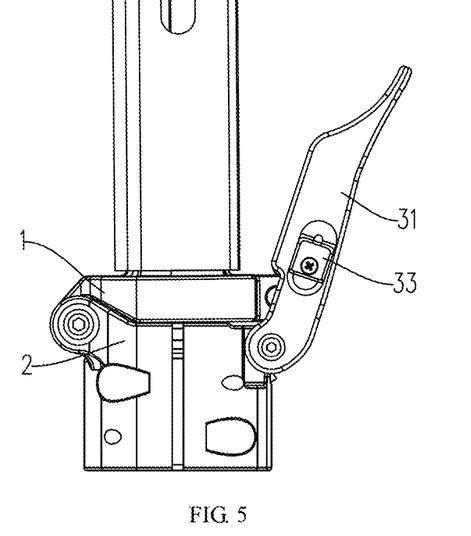
FIG. 5 is a schematic view of a first locking assembly of a folding device in a transition position according to an embodiment of the present disclosure.
Figure 6:
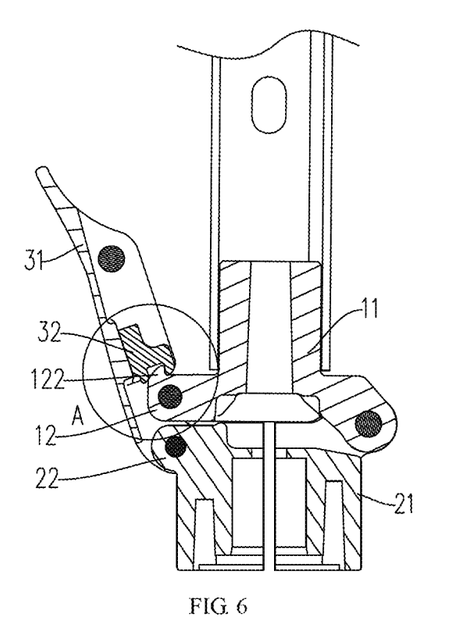
FIG. 6 is a schematic view of another first locking assembly of a folding device in a transition position according to an embodiment of the present disclosure.
Figure 7:
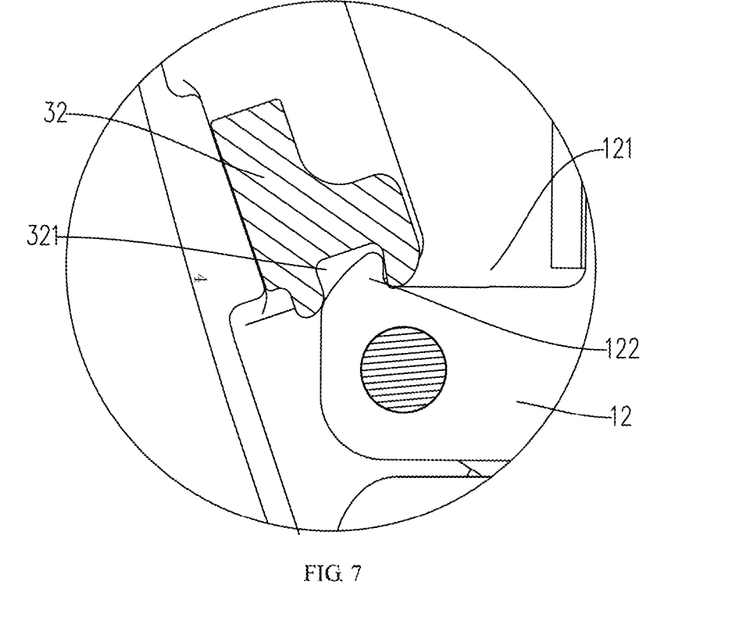
FIG. 7 is a partial enlarged view of part A of the folding device illustrated in FIG. 6.

As illustrated in FIGS. 5-7, in some embodiments, a first bump 122 is arranged on a side of the first protrusion 12 away from the second protrusion 22. The first bump 122 and the first body 11 are spaced apart from each other and define the first groove 121 therebetween, that is, the first groove 121 is formed between the first bump 122 and the first body 11. A second groove 321 is formed in the outer end of the locking block 32. The unlocking wrench 31 is adapted to move from the second position to the first position via a transition position. In the transition position, the first bump 122 is clamped in the second groove 321. The first bump 122 is away from the second groove 321 when the unlocking wrench 31 is in the first position, in the second position, between the first position and the transition position, or between the second position and the transition position.

When the unlocking wrench 31 is in the transition position, the first bump 122 is clamped in the second groove 321. The first folding seat 1 and the second folding seat 2 are in a primary locking state—only the first locking assembly 3 is working and the second locking assembly 4 is not working. In such a case, the user can ride safely. Afterwards, the user may continue to turn the unlocking wrench 31 to be moved into the first position, and the folding device is in a secondary locking state—the first locking assembly 3 and the second locking assembly 4 are working at the same time and the locking block 32 is also working, which can ensure that the folding device will not be opened due to false touch.

Figure 8:
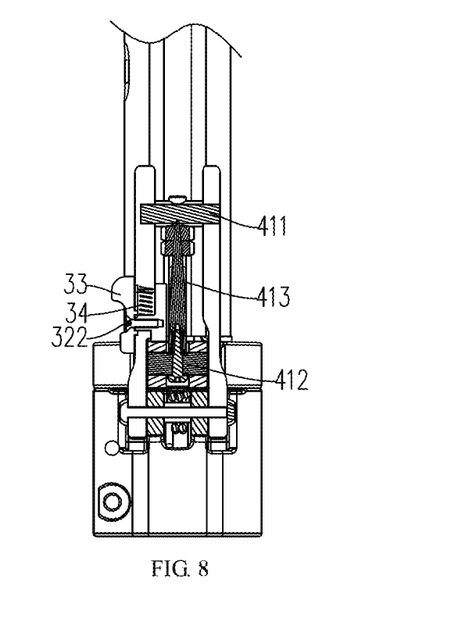
FIG. 8 is a side view of a folding device according to an embodiment of the present disclosure.
Figure 9:
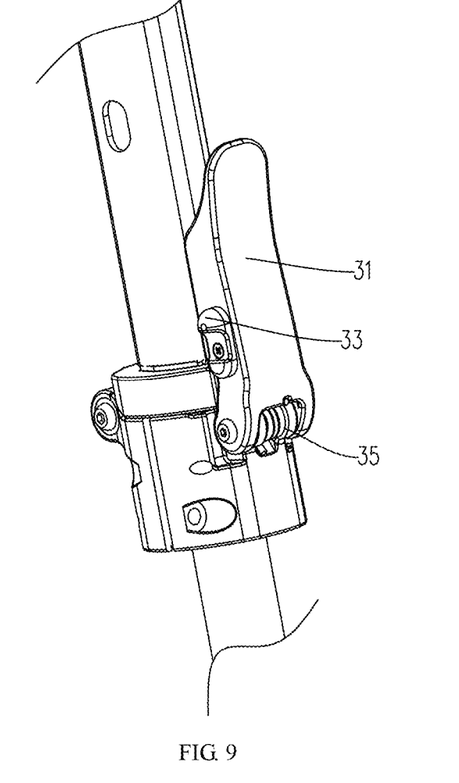
FIG. 9 is a perspective view of a folding device according to an embodiment of the present disclosure.
Figure 10:
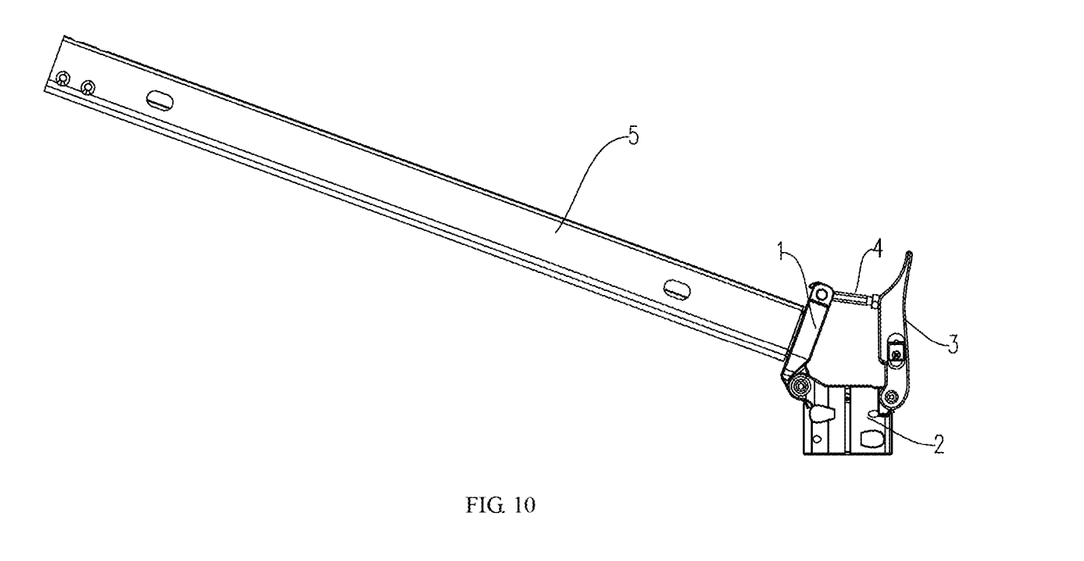
FIG. 10 is a schematic view of a first locking assembly of a folding device in a second position according to an embodiment of the present disclosure.

As illustrated in FIG. 8 and FIG. 9, in some embodiments, the first locking assembly 3 further includes an unlocking knob 33 coupled to the locking block 32. The unlocking knob 33 is arranged on the unlocking wrench 31 and may move along the length direction of the unlocking wrench 31 to drive the locking block 32 to move in the cavity of the unlocking wrench 31. Specifically, the unlocking knob 33 is located on an outer side of the unlocking wrench 31 and is convenient for the user to operate. During use, the user can adjust the relative position of the locking block 32 and the first groove 121 to lock or unlock the unlocking wrench 31, by simply toggling the unlocking knob 33 by hand.

As illustrated in FIG. 3 and FIG. 8, in some embodiments, a mounting groove is formed in a side of the unlocking wrench 31 away from the first body 11 and is in communication with an inner chamber of the unlocking wrench 31. The locking block 32 has a second bump 322, and the second bump 322 is fitted in the mounting groove. The reset member includes a reset compression spring 34 arranged in the mounting groove. A first end of the reset compression spring 34 is coupled to an end of the second bump 322 away from the second folding seat 2, and a second end of the reset compression spring 34 is coupled to a wall surface of the mounting groove. In other words, the locking block 32 has the second bump 322 located in the mounting groove; the unlocking knob 33 is coupled to the second bump 322 to drive the locking block 32 to move; and the reset compression spring 34 is arranged between the second bump 322 and the wall surface of the mounting groove, such that the second bump exerts an action force towards the first groove 121.

With this arrangement, the user can turn the locking block 32 away from the first groove 121 by the unlocking knob 33, such that the unlocking wrench 31 is rotated from the first position to the second position to release the first folding seat 1. When the user moves the unlocking wrench 31 from the second position to the first position, under an action of the reset compression spring 34, the locking block 32 is automatically clamped into the first groove 121 to lock the unlocking wrench 31, such that the unlocking wretch 31 cannot rotate.

As illustrated in FIG. 3 and FIG. 9, in some embodiments, the reset member further includes a reset torsion spring 35 arranged at a junction of the unlocking wrench 31 and the second protrusion 22. The reset torsion spring 35 exerts an action force to turn the unlocking wrench 31 to the first position. The user moves the unlocking wrench 31 from the first position to the second position, and folds the first folding seat 1 and the second folding seat 2 or makes the first folding seat 1 and the second folding seat 2 arranged oppositely. Afterwards, the unlocking wrench 31 may automatically reset and move from the second position to the transition position, to press the first folding seat 1 against the second folding seat 2. In such a way, it is possible to prevent the user from forgetting to reset the unlocking wrench 31 due to carelessness, and the folding device can be more reliable.

Figure 11:
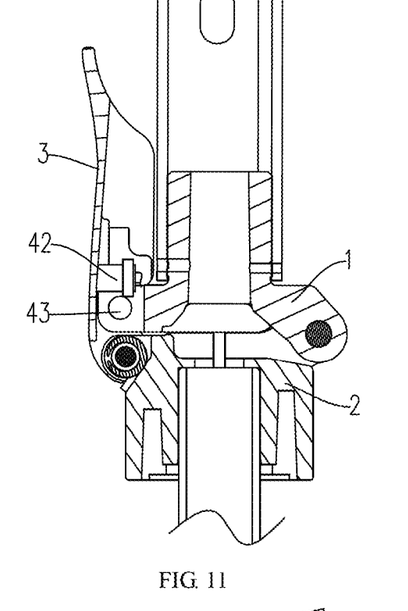
FIG. 11 is a schematic view of a folding device according to another embodiment of the present disclosure.

As illustrated in FIG. 11, in some embodiments, the second locking assembly 4 is a linkage assembly 41. A first end of the linkage assembly 41 is rotatably coupled to the first folding seat 1, and a second end of the linkage assembly 41 is rotatably coupled to the first locking assembly 3. The linkage assembly 41, the first folding seat 1, the second folding seat 2, and the first locking assembly 3 are sequentially coupled end to end to form a four-link mechanism.

In the second position, there is an angle between a length direction of the linkage assembly 41 and a length direction of the first locking assembly 3, and the four-link mechanism may rotate freely. In the first position, the length direction of the linkage assembly 41 is parallel to the length direction of the first locking assembly 3, the four-bar mechanism is in a locking state, only the first locking assembly 3 may move to the second position, that is, move to the outside, and other components cannot be moved or rotated. Further, the first locking assembly 3 cannot move freely under the action of the locking block 32, and the first locking assembly 3 and the second locking assembly 4 are working at the same time, such that the locking is stable and reliable.

In some embodiments, the second locking assembly 4 is a pressing member 42 coupled to the first locking assembly 3, and the first folding seat 1 is provided with a positioning member 43. In the first position, the pressing member 42 presses against a side of the positioning member 43 away from the second folding seat 2 to tightly clamp the first folding seat 1 and the first locking assembly 3, in which case the first locking assembly 3 and the second locking assembly 4 work conjunctively, and the second locking assembly 4, the first folding seat 1 and the first locking assembly 3 cannot move relatively. In the second position, the pressing member 42 is away from the positioning member 43 to release the first folding seat 1 and the first locking assembly 3, in which case neither the first locking assembly 3 nor the second locking assembly 4 works, and the first folding seat 1 and the first locking assembly 3 may rotate freely.

Specifically, the pressing member 42 is cylindrical, the positioning member 43 is cylindrical, and an axial direction of the pressing member 42 is perpendicular to an axial direction of the positioning member 43. A flange is arranged on an end of the pressing member 42 away from the first locking assembly 3. The flange may press against the positioning member 43 and get away from the positioning member 43. The flange is clamped at a side of the positioning member 43 close to the first body 11, and the flange can prevent the pressing member 42 from slipping off the positioning member 43, which may lead to a better locking effect. The pressing member 42 is a bolt, and the bolt may be slightly adjusted by rotation, such that a pressing allowance between the pressing member 42 and the positioning member 43 can be adjusted.

Figure 12:
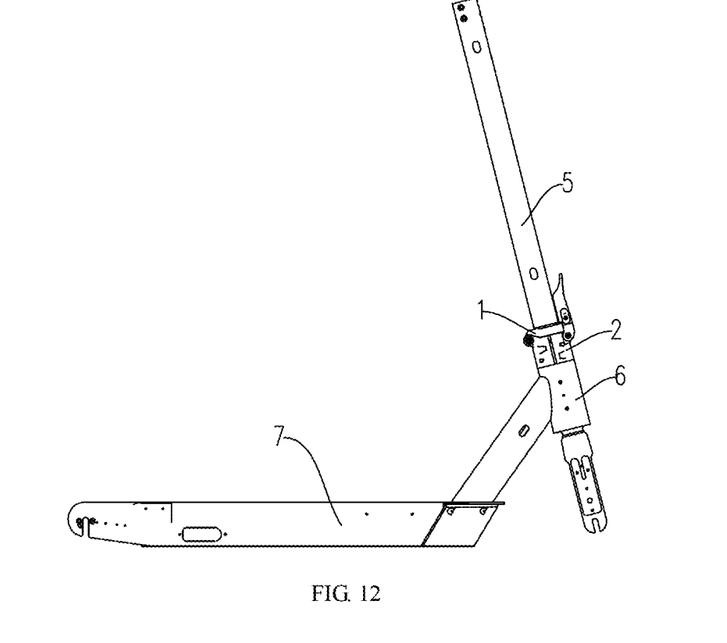
FIG. 12 is a schematic view of a scooter according to an embodiment of the present disclosure.

As illustrated in FIG. 12, the scooter according to another embodiment of the present disclosure includes a folding device, a vertical tube 5 and a front stem and fork 6. The folding device is the folding device according to the above embodiments of the present disclosure. The vertical tube 5 is coupled to an end of the first folding seat 1 away from the second folding seat 2. The front stem and fork 6 is coupled to an end of the second folding seat 2 away from the first folding seat 1. The other end of the vertical tube 5 is configured to mount a handle, and the front stem and fork 6 is configured to couple a front stem and fork and a frame 7.

The folding device according to some specific examples of the present disclosure will be described below with reference to the drawings.

As illustrated in FIGS. 1-3, the folding device according to the embodiments of the present disclosure includes a first folding seat 1, a second folding seat 2, a first locking assembly 3 and a second locking assembly 4. The first folding seat 1 and the second folding seat 2 are arranged oppositely. The first locking assembly 3, the second locking assembly 4, the first folding seat 1 and the second folding seat 2 are rotatably coupled end to end in sequence to form a four-link mechanism.

Specifically, the first folding seat 1 and the second folding seat 2 are coupled by a first rotating shaft 13, and the first locking assembly 3 and the second folding seat 2 are coupled by a second rotating shaft 23. The second locking assembly 4 is a linkage assembly 41. The linkage assembly 41 includes a connecting rod 413, as well as a third rotating shaft 411 and a fourth rotating shaft 412 located at both ends of the connecting rod 413. The connecting rod is coupled to the first locking assembly 3 through the third rotating shaft 411, and the connecting rod is coupled to the first folding seat 1 through the fourth rotating shaft 412.

The first folding seat 1 includes a first body 11 and a first protrusion 12, and the first protrusion 12 protrudes outwards from a periphery of the first body 11. The second folding seat 2 includes a second body 21 and a second protrusion 22, and the second protrusion 22 protrudes outwards from a periphery of the second body 21. The first protrusion 12 is arranged opposite to the second protrusion 22, and a side of the first protrusion 12 away from the second protrusion 22 is provided with a first groove 121.

As illustrated in FIG. 2 and FIG. 8, the first locking assembly 3 includes an unlocking wrench 31, a locking block 32, an unlocking knob 33, a reset compression spring 34, and a reset torsion spring 35. The unlocking wrench is rotatably coupled to the second protrusion 22. The unlocking wrench 31 is rotatable between the first position and the second position. The unlocking wrench 31 has a cavity, and the locking block 32 is fitted in the cavity of the unlocking wrench 31. The unlocking knob 33 is arranged on the unlocking wrench 31 and coupled to the locking block 32, and the unlocking knob 33 drives the locking block 32 to move along a length direction of the unlocking wrench 31, such that the locking block 32 approaches or gets away from the first groove 121.

A mounting groove is formed in a side of the unlocking wrench 31 away from the first body 11 and is in communication with an inner chamber of the unlocking wrench 31. The locking block 32 has a second bump 322 located in the mounting groove. The unlocking knob 33 is coupled to the second bump 322 to drive the locking block 32 to move. The reset compression spring 34 is arranged between the second bump 322 and a wall surface of the mounting groove, and the second bump exerts an action force towards the first groove 121. The reset torsion spring 35 is arranged at a junction of the unlocking wrench 31 and the second protrusion 22, and the reset torsion spring 35 exerts an action force to turn the unlocking wrench 31 to the first position.

As illustrated in FIG. 6 and FIG. 7, a first bump 122 is arranged on a side of the first protrusion 12 away from the second protrusion 22, and a first groove 121 is formed between the first bump 122 and the first body 11. A second groove 321 is formed in an outer end of the locking block 32. The unlocking wrench 31 is adapted to move from the second position to the first position via a transition position. In the transition position, the first bump 122 is clamped in the second groove 321, and the first folding assembly 3 is working, such that the folding device achieves the primary locking.

Locking and unlocking processes of the folding device will be illustrated below.

Locking process: the unlocking wrench 31 is in the second position, the folding device is in a folded state, and the user turns the first folding seat 1 to change the folding device from the folded state to an upright state. In this process, the unlocking wrench 31 automatically changes from the second position to the transition position under an action of the reset torsion spring 35, and the first bump 122 is clamped in the second groove 321. At this time, the folding device achieves the primary locking, that is, only the first locking assembly is working and the second locking assembly is not working. Afterwards, the user moves the unlocking wrench 31 from the transition position to the first position by hand, and the outer end of the locking block 32 is automatically clamped in the first groove 121 under the action of the reset compression spring 34. At this time, the folding device achieves the secondary locking, that is, the first locking assembly 3 and the second locking assembly 4 are working at the same time, and the locking block 32 is clamped in the first groove 121, in which way the unlocking wrench 31 may be prevented from moving to the second position and serve as a safety lock.

Unlocking process: the user toggles the unlocking knob 33, and the unlocking knob 33 drives the locking block 32 to get away from the first groove 121. At this time, the locking block 32 fails, and the user moves the first locking assembly 3 from the first position to the second position via the transition position. In the transition position, the first locking assembly 3 is working, the second locking assembly 4 fails, and the folding device is in the primary locking state. Afterwards, the users continues to move the unlocking wrench 31 to the second position, the first locking assembly 3 fails, and hence the folding device is unlocked.

In the description of the present disclosure, it should be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience and simplicity of description and do not indicate or imply that the devices or elements referred to have a particular orientation and be constructed or operated in a particular orientation. Thus, these terms shall not be construed as limitation on the present disclosure.

In addition, terms such as "first" and "second" are used herein for purposes of description and are not intended to indicate or imply relative importance or significance or to imply the number of indicated technical features. Thus, the feature defined with "first" and "second" may explicitly or implicitly comprise one or more of this feature. In the description of the present disclosure, the term "a plurality of" means at least two, such as two, three, etc., unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or communicate with each other; may also be direct connections or indirect connections via intervening structures; may also be inner communication or interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the above terms throughout this specification are not necessarily referring to the same embodiment or example of the present disclosure. Furthermore, the particular features, structures, materials, or characteristics may be combined in any suitable manner in one or more embodiments or examples. Moreover, those skilled in the art can integrate and combine the different embodiments or examples and the features of the different embodiments or examples described in this specification without contradicting each other.

Although embodiments of the present disclosure have been shown and described, it can be appreciated by those skilled in the art that the above embodiments are merely exemplary and are not intended to limit the present disclosure, and various changes, modifications, alternatives and variations may be made in the embodiments within the scope of the present disclosure.

What is claimed is:

1. A folding device, comprising:
a first folding seat and a second folding seat arranged opposite to each other and rotatably coupled to each other, the first folding seat being located above the second folding seat;
a first locking assembly rotatably coupled to the second folding seat, the first locking assembly being rotatable between a first position where the first locking assembly presses the first folding seat against the second folding seat and a second position where the first locking assembly releases the first folding seat;
a second locking assembly coupled to at least one of the first folding seat and the first locking assembly to clamp or release the first folding seat and the first locking assembly; and
a reset member coupled to at least one of the first locking assembly and the second locking assembly, and configured to perform at least one of resetting the first locking assembly after the first locking assembly is rotated from the first position to the second position, and resetting the second locking assembly after the second locking assembly releases the first folding seat and the first locking assembly;
the first folding seat comprises a first body and a first protrusion protruding outwards from a periphery of the first body, and the second folding seat comprises a second body and a second protrusion protruding outwards from a periphery of the second body, the first protrusion being arranged opposite to the second protrusion;
a first bump is arranged on a side of the first protrusion away from the second protrusion, the first bump is spaced apart from the first body;
the first locking assembly comprises an unlocking wrench having a cavity and a locking block fitted in the cavity;
a second groove is formed in an outer end of the locking block, the outer end being an end of the locking block close to the first protrusion, and the unlocking wrench is configured to move from the second position to the first position via a transition position, wherein in the transition position, the first bump is clamped in the second groove, and wherein the first bump is away from the second groove when the unlocking wrench is in the first position, in the second position, between the first position and the transition position, or between the second position and the transition position.

2. The folding device according to claim 1, wherein a first groove is formed in a side of the first protrusion away from the second protrusion; and
wherein the first locking assembly is rotatably coupled to the second protrusion, in the first position, at least a part of the first locking assembly is clamped in the first groove, and in the second position, at least the part of the first locking assembly is away from the first groove.

3. The folding device according to claim 2, wherein
the unlocking wrench rotatably coupled to the second protrusion; and
the locking block, wherein the locking block is movable along a length direction of the unlocking wrench relative to the unlocking wrench to enable an outer end of the locking block to be clamped in the first groove in the first position and enable the outer end of the locking block to be away from the first groove before the unlocking wrench moves from the first position to the second position.

4. The folding device according to claim 3, wherein the first groove is formed between the first bump and the first body.

5. The folding device according to claim 3, wherein the first locking assembly further comprises an unlocking knob coupled to the locking block, and wherein the unlocking knob is arranged on the unlocking wrench and movable along the length direction of the unlocking wrench to drive the locking block to move in the cavity.

6. The folding device according to claim 5, wherein a mounting groove is formed in a side of the unlocking wrench away from the first body, the locking block has a second bump, and the second bump is fitted in the mounting groove;
the reset member comprises a reset compression spring arranged in the mounting groove, and the reset compression spring has a first end coupled to an end of the second bump away from the second folding seat, and a second end coupled to a wall surface of the mounting groove.

7. The folding device according to claim 3, wherein the reset member further comprises a reset torsion spring arranged at a junction of the unlocking wrench and the second protrusion, and the reset torsion spring exerts an action force to turn the unlocking wrench to the first position.

8. The folding device according to claim 1, wherein the second locking assembly is a linkage assembly, and the linkage assembly has a first end rotatably coupled to the first folding seat and a second end rotatably coupled to the first locking assembly,
wherein in the second position, an angle is formed between a length direction of the linkage assembly and a length direction of the first locking assembly, and in the first position, the length direction of the linkage assembly is parallel to the length direction of the first locking assembly.

9. The folding device according to claim 6, wherein a side surface of the first bump away from the first body is inclined towards the first body along a direction from the second folding seat to the first folding seat, and a side surface of the locking block adjacent to the first body is inclined towards the first body along the direction from the second folding seat to the first folding seat.

10. The folding device according to claim 1, wherein the second locking assembly is a pressing member coupled to the first locking assembly, and the first folding seat is provided with a positioning member,
wherein in the first position, the pressing member presses against a side of the positioning member away from the second folding seat to clamp the first folding seat and the first locking assembly, and in the second position, the pressing member is away from the positioning member to release the first folding seat and the first locking assembly.

11. The folding device according to claim 10, wherein the pressing member is cylindrical, and a flange is arranged on an end of the pressing member away from the first locking assembly and is able to press against the positioning member and be away from the positioning member, wherein the positioning member is cylindrical, and an axial direction of the pressing member is perpendicular to an axial direction of the positioning member.

12. A scooter, comprising:
a folding device comprising:

a first folding seat and a second folding seat arranged opposite to each other and rotatably coupled to each other, the first folding seat being located above the second folding seat;

a first locking assembly rotatably coupled to the second folding seat, the first locking assembly being rotatable between a first position where the first locking assembly presses the first folding seat against the second folding seat and a second position where the first locking assembly releases the first folding seat;

a second locking assembly coupled to at least one of the first folding seat and the first locking assembly to clamp or release the first folding seat and the first locking assembly; and a reset member coupled to at least one of the first locking assembly and the second locking assembly, and configured to perform at least one of resetting the first locking assembly after the first locking assembly is rotated from the first position to the second position, and resetting the second locking assembly after the second locking assembly releases the first folding seat and the first locking assembly;

the first folding seat comprises a first body and a first protrusion protruding outwards from a periphery of the first body, and the second folding seat comprises a second body and a second protrusion protruding outwards from a periphery of the second body, the first protrusion being arranged opposite to the second protrusion;

the first locking assembly comprises an unlocking wrench having a cavity and a locking block fitted in the cavity;

a first bump is arranged on a side of the first protrusion away from the second protrusion, the first bump is spaced apart from the first body;

a second groove is formed in an outer end of the locking block, the outer end being an end of the locking block close to the first protrusion, and the unlocking wrench is configured to move from the second position to the first position via a transition position, wherein in the transition position, the first bump is clamped in the second groove, and wherein the first bump is away from the second groove when the unlocking wrench is in the first position, in the second position, between the first position and the transition position, or between the second position and the transition position;

a vertical tube coupled to an end of the first folding seat away from the second folding seat; and a front stem and fork coupled to an end of the second folding seat away from the first folding seat.

13. The scooter according to claim 12, wherein the first locking assembly, the second locking assembly, the first folding seat and the second folding seat are rotatably coupled end to end in sequence to form a four-link mechanism.

14. The scooter according to claim 13, wherein the first folding seat and the second folding seat are coupled by a first rotating shaft, and the first locking assembly and the second folding seat are coupled by a second rotating shaft; and wherein the second locking assembly is a linkage assembly, the linkage assembly comprises a connecting rod, as well as a third rotating shaft and a fourth rotating shaft located at both ends of the connecting rod; and wherein the connecting rod is coupled to the first locking assembly by the third rotating shaft, and the connecting rod is coupled to the first folding seat by the fourth rotating shaft.

15. The scooter according to claim 12, wherein a first groove is formed in a side of the first protrusion away from the second protrusion; and wherein the first locking assembly is rotatably coupled to the second protrusion, in the first position, at least a part of the first locking assembly is clamped in the first groove, and in the second position, at least the part of the first locking assembly is away from the first groove.

16. The scooter according to claim 15, wherein the first locking assembly comprises:

the unlocking wrench rotatably coupled to the second protrusion; and the locking block, wherein the locking block is movable along a length direction of the unlocking wrench relative to the unlocking wrench to enable an outer end of the locking block to be clamped in the first groove in the first position and enable the outer end of the locking block to be away from the first groove before the unlocking wrench moves from the first position to the second position.

17. The scooter according to claim 16, wherein the first groove is formed between the first bump and the first body.

18. The scooter according to claim 16, wherein the first locking assembly further comprises an unlocking knob coupled to the locking block, and wherein the unlocking knob is arranged on the unlocking wrench and movable along the length direction of the unlocking wrench to drive the locking block to move in the cavity.

* * * * *